May 22, 1956 — R. C. DAVIS — 2,746,764
OVERLOAD COIL SPRING
Filed July 2, 1953

INVENTOR
RAYMOND C. DAVIS
BY Williamson, Williamson
Schroeder & Adams
ATTORNEYS

United States Patent Office 2,746,764
Patented May 22, 1956

2,746,764

OVERLOAD COIL SPRING

Raymond C. Davis, Halma, Minn., assignor of one-half to Lee H. Folland, Halma, Minn.

Application July 2, 1953, Serial No. 365,727

3 Claims. (Cl. 280—124)

This invention relates to a spring assembly and more particularly to an overload coil spring to be used in conjunction with the rear axles of automobiles and trucks.

I am aware of numerous spring devices which have been proposed for relieving the strain on conventional vehicle springs, especially in connection with the rear springs of automotive trucks.

These prior art devices, insofar as I am aware, are supplemental springs which work conjointly with the standard springs and are either mounted directly on the standard spring and in contact with the vehicle frame or are interposed with each end in spaced relation between the axle housing and the framework of the vehicle. The overload or supplemental spring arrangements of the prior art devices thus cause a stiffening of the entire spring suspension and cause a vehicle with an overload spring attachment to be rough riding when it is not carrying a full load.

If the prior art overload spring were to be shortened so as to provide clearance between the top thereof and the framework in its interposed condition between the leaf spring and the overlying framework structure, then the coil spring would be so short as to be ineffectual when a sufficient load is placed in the truck to cause the contact of the spring by the framework. If a longer spring is clamped to the cylindrical area of the axle housing and is made long enough to be effective, yet providing clearance between the top of the spring and the framework so that the vehicle will use the conventional spring only under normal circumstances, then the shock of engagement with the overload spring when the truck is loaded more heavily will tend to cause the mounting structure to turn and become displaced from its upright position on the axle housing.

It is a general object of my invention to provide an overload coil spring which will be potentially positioned in a rigid upright position and in spaced clearance of the framework of a vehicle such as a truck so as to be employed when the loading of the truck exceeds a predetermined value.

It is another object of the invention to provide for positioning and mounting of an overload coil spring of the class described in which the spring will be firmly held against rotation while at the same time not relying upon interconnection between both the framework and the axle housing.

These and other objects and advantages of my invention will more fully appear from the following description made in connection with the accompanying drawing wherein like reference characters refer to similar parts throughout the several views and in which.

Figure 2:
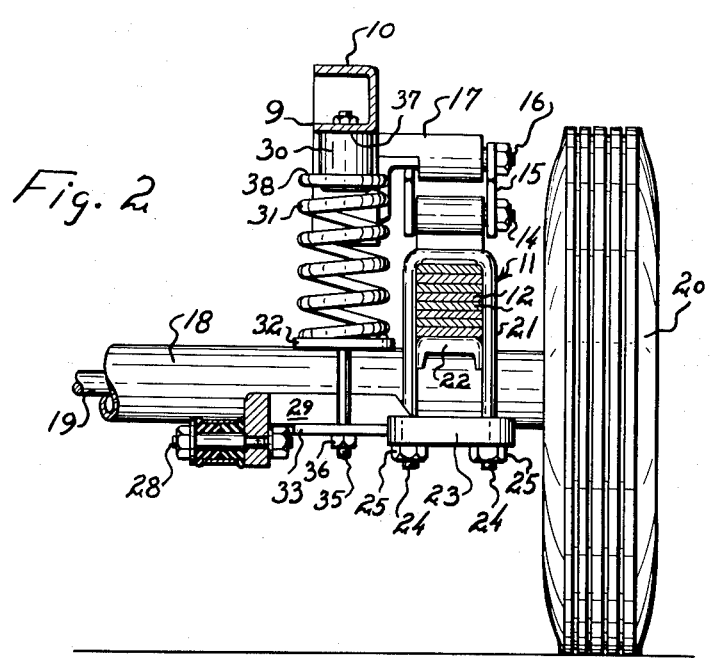
Fig. 2 is a vertical sectional view taken on the line 2—2 of Fig. 2 and showing the relative relationship of my overload coil spring with other conventional elements of a truck rear wheel spring suspension.

Referring now more particularly to the drawings, an ordinary frame structure at one side of the rear of a vehicle such as a truck is indicated generally at 10. The frame is usually offset in a curved portion 9 and may be constructed of channel members, such as may be seen by the cross sectional appearance in Fig. 2. A conventional leaf spring assembly is shown at 11 and comprises the conventional individual spring leaves 12 which are progressively longer from the bottom to the top as shown. The forward end of the leaf spring assembly 11 is pivotally mounted to the frame 10 by the bolt 13 and the rearward end of the leaf spring assembly 11 is conventionally pivoted by bolt 14 to shackle 15 which in turn is pivotally mounted as by the bolt 16 to a bracket member 17 which is rigidly secured to the frame member 10 as shown in Fig. 2. An axle housing 18 carries the axle 19 which in turn is secured to a rear wheel 20 by the usual automotive parts (not shown). The leaf spring assembly 11 is rigidly clamped as by U-shaped bolts 21 to the axle housing 18, the plates 22 and 23 being exposed in contact with the axle housing 18 as shown. The ends of U-bolts 21 extend downwardly through the plate 23 with the threaded ends 24 held in place by means of nuts 25. In the class of conventional vehicles under consideration a shock absorber assembly 26 is pivotally secured at 27 to the frame 10 and is similarly pivoted at 28 to a mounting bracket 29 which in turn is secured to the axle housing 18 and preferably to the leaf spring assembly as shown in Fig. 2.

It is understood that in the ordinary vehicle arrangement a pair of the leaf spring assemblies 11 are disposed in spaced relation adjacent the rear wheels of the vehicle and a pair of conventional shock absorbers 26 are likewise arranged in spaced relation, each being inside of and adjacent a spring assembly 11.

A resilient bumper element 30 is ordinarily secured to the framework and aligned with the axle housing 18 so that if an extremely drastic bump is encountered, the resilient bumper 30 will prevent the curved frame portion 11 from striking the axle housing 18 with a blow severe enough to crack or break the housing.

Figure 1:
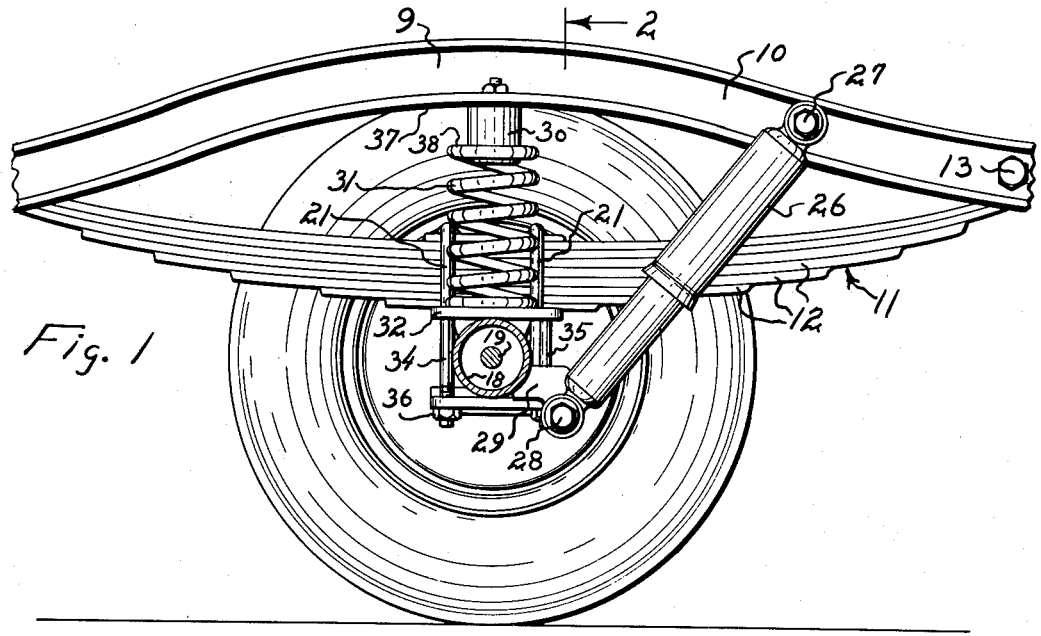
Fig. 1 is a vertical sectional view taken through the axle and housing of a truck to which has been attached my overload coil spring, the view being taken from underneath the frame of the car looking outwardly toward the spring suspension and side of the frame. Unessential details of the truck and frame construction have been omitted.

My invention comprises an overload coil spring 31 which has its lower end rigidly secured to an upper clamping member or plate 32 which in turn is adapted to rest upon the upper curved surface of the tubular axle housing 18. The clamping member 32 is disposed laterally to the longitudinal direction of tubular axle housing 18 with its ends extending outwardly as shown in Fig. 1. Another and lower clamping member or plate 33 is positioned at the under curved surface of the tubular housing 18 and directly underlying the upper clamping member or plate 32. My arrangement is such that the clamping members 32 and 33 will be positioned intermediate the shock absorber 26 and the leaf spring assembly 11. The under clamping member or plate 33 is extended so as to rest against not only the axle housing 18 but also the mounting bracket 29 which is secured to and forms the lower end portion of the shock absorber 26. By my novel clamping arrangement I am thus able to form a rigid and non-rotatable clamping structure upon the axle housing 18 which, normally, because of its tubular construction would not lend itself to rigid clamping to prevent rotation thereabout under shock and stress. I may employ such conventional means for drawing together the clamping members or plates 32 and 33 as bolts 34 and 35. The bolt 34 passes rearwardly of the axle housing 18 and its threaded end may pass through the lower clamping member 33 to be secured by the nut 36. The bolt 35, on the other hand, extends forwardly of the axle housing 18 and also forwardly of the mounting bracket 29 with its threaded end passing through lower clamping member 33 to be secured thereagainst by nut 36.

As to the coil spring 31, it is to be noted that it is positioned vertically upon the axle housing 18 and in alignment with the undersurface 37 of the frame 10. The top of the coil spring 38 is in spaced clearance with the undersurface 37 of the frame and, under normal circumstances, with a light load or no load at all will allow the spring assembly 11 to function without bringing into play the overload coil spring 31. Such an arrangement makes for easy riding and helps minimize destruction and wear of the truck due to vibration and jarring. My arrangement is in contradistinction to conventional overload spring arrangements which are in continual usage even when the truck is empty or likely loaded. By my particular arrangement I have been able to establish an adequate clearance between the top 38 of my overload coil spring with the bottom surface 37 of frame 10 to provide the normal spring range under the above noted conditions during light loading when the truck box is completely empty, but have at the same time provided a sufficient length of coil spring so as to be effective in progressively stiffening and supplementing the spring structure when heavy loading or vigorous bumps are encountered. It will be noted that the coil spring 31 has a length in the order of the normal spacing between the leaf spring assembly 11 and the undersurface of frame 10, but by virtue of its special mounting has provided adequate clearance as previously noted.

Further, the clamping arrangement is such as to prevent the spring from being rotated about the axle housing 18 even under heavy shocks and continuous lateral thrusts from the framework 10. Heretofore, it has been thought necessary to anchor both the upper end and the lower end of an overload coil spring so as to prevent displacement thereof. My structure, however, has been able to utilize a complete clearance between the overload spring and the frame member under ordinary conditions with a secure clamping arrangement to prevent displacement or rotation of the coil spring while at the same time providing an adequate range of compression to achieve an overall spring stiffening when the occasion demands.

It will, of course, be understood that various changes may be made in the form, details, arrangement and proportions of the parts without departing from the scope of my invention.

What I claim is:

1. In a vehicle the combination with a tubular rear wheel housing, a vehicle frame, a pair of spaced conventional springs and a conventional shock absorber spaced adjacent and inwardly from each of said conventional springs, of an overload coil spring overlying said axle at a position intermediate each conventional spring and each adjacent shock absorber, said overload coil spring being positioned vertically and having its upper end normally terminating in spaced relation with an undersurface of said frame, an upper plate rigidly attached to the lower end of the coil spring and a lower plate underlying said coil spring and said upper plate and means for removably securing said coil spring, upper plate and lower plate in non-rotatable engagement with the tubular axle housing and a portion of the shock absorber.

2. In a vehicle the combination with a tubular rear axle housing, a vehicle frame, a pair of spaced conventional springs and a conventional shock absorber spaced adjacent and inwardly from each of said conventional springs, of an overload coil spring overlying said axle at a position intermediate each conventional spring and each adjacent shock absorber, said overload coil spring being of substantially the same length as the normal distance between said conventional spring and the frame while having its upper end in vertical spaced relation with the frame, and a clamping structure rigidly secured to the lower end of said coil spring for removably securing the coil spring in non-rotatable engagement with both the tubular axle housing and a portion of the shock absorber.

3. An auxiliary spring attachment for automobiles, trucks and the like having a tubular rear axle housing, a vehicle frame, a pair of spaced conventional leaf springs and a conventional shock absorber spaced adjacent and inwardly of each of said conventional springs, said auxiliary spring attachment comprising a dual clamping structure having coacting plates for simultaneously securing in non-rotatable rigid mounting to both the tubular rear axle housing and a portion of said adjacent shock absorber, said dual clamp further having an upper attaching surface, and a coil compression spring rigidly secured to said attaching surface of the dual clamp at its lower end and positionable in upstanding relation overlying said axle at a position intermediate each conventional spring and each adjacent shock absorber, said coil compression spring being of substantially the same length as the normal distance between said conventional leaf spring and the vehicle frame to which the conventional leaf spring is attached, said coil compression spring having its upper end in vertical spaced relation with said frame and to one side of the attachment of said conventional leaf spring with the vehicle frame, whereby said coil compression spring will function as an overload spring of sufficient length and rigidity to permit non-jarring movement of the automobile frame while at the same time permitting normal spring suspension and movement of said vehicle when normal loads are carried by the vehicle.

References Cited in the file of this patent

UNITED STATES PATENTS

| | | |
|---|---|---|
| 830,454 | Sager | Sept. 4, 1906 |
| 1,937,854 | Stratton | Dec. 5, 1933 |
| 2,431,440 | Willis | Nov. 25, 1947 |
| 2,658,749 | Alletto | Nov. 10, 1953 |